(12) United States Patent
Stastny et al.

(10) Patent No.: US 9,657,949 B2
(45) Date of Patent: May 23, 2017

(54) COMBUSTOR SKIN ASSEMBLY FOR GAS TURBINE ENGINE

(71) Applicant: PRATT & WHITNEY CANADA CORP., Longueuil (CA)

(72) Inventors: Honza Stastny, Georgetown (CA); Robert Sze, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 557 days.

(21) Appl. No.: 13/651,527

(22) Filed: Oct. 15, 2012

(65) Prior Publication Data

US 2014/0338346 A1  Nov. 20, 2014

(51) Int. Cl.
*F23R 3/06* (2006.01)
*F23R 3/00* (2006.01)
*F23R 3/60* (2006.01)

(52) U.S. Cl.
CPC .............. *F23R 3/06* (2013.01); *F23R 3/002* (2013.01); *F23R 3/60* (2013.01); *F23R 2900/00017* (2013.01); *F23R 2900/03041* (2013.01); *F23R 2900/03044* (2013.01); *Y02T 50/675* (2013.01); *Y10T 29/49316* (2015.01)

(58) Field of Classification Search
CPC .. F23R 3/002; F23R 3/06; F23R 60/10; F23R 60/42; F23R 2900/03044; F23R 2900/00017; F23R 2900/00018; F01D 9/023; F23C 9/08
USPC .................................... 60/752–760, 796, 797
See application file for complete search history.

(56) References Cited

U.S. PATENT DOCUMENTS

| | | | | |
|---|---|---|---|---|
| 4,555,901 | A * | 12/1985 | Wakeman et al. | 60/796 |
| 4,614,082 | A * | 9/1986 | Sterman et al. | 60/796 |
| 5,085,038 | A | 2/1992 | Todman et al. | |
| 5,598,697 | A * | 2/1997 | Ambrogi et al. | 60/782 |
| 5,758,504 | A | 6/1998 | Abreu et al. | |
| 6,079,199 | A | 6/2000 | McCaldon et al. | |
| 6,536,201 | B2 * | 3/2003 | Stuttaford et al. | 60/782 |
| 7,000,406 | B2 | 2/2006 | Markarian | |
| 7,082,766 | B1 * | 8/2006 | Widener et al. | 60/752 |
| 7,350,358 | B2 | 4/2008 | Patel | |
| 7,836,702 | B2 | 11/2010 | Grivas et al. | |
| 2010/0218509 | A1 | 9/2010 | Milner | |
| 2011/0179804 | A1 * | 7/2011 | Nager | F01D 9/023 60/796 |

\* cited by examiner

*Primary Examiner* — Steven Sutherland
(74) *Attorney, Agent, or Firm* — Norton Rose Fulbright Canada LLP

(57) ABSTRACT

A combustor assembly includes a hot skin of a combustion chamber wall having an inner face exposed to the combustion chamber and an opposite outer face, a receiving skin having a securing portion affixed to the hot skin outer face in an air-tight manner and a receiving flange, extending from the securing portion, that is offset from the hot skin outer face to form a female recess, a cold skin having a cold wall portion spaced from the hot skin and forming a cooling cavity therebetween, a securing portion extending from a first end of the cold wall portion affixed to the hot skin outer face in an air-tight manner and a male flange extending from a second end of the cold wall portion opposite the first end, the male flange snugly received in the female recess and forming a sliding engagement therebetween.

12 Claims, 3 Drawing Sheets

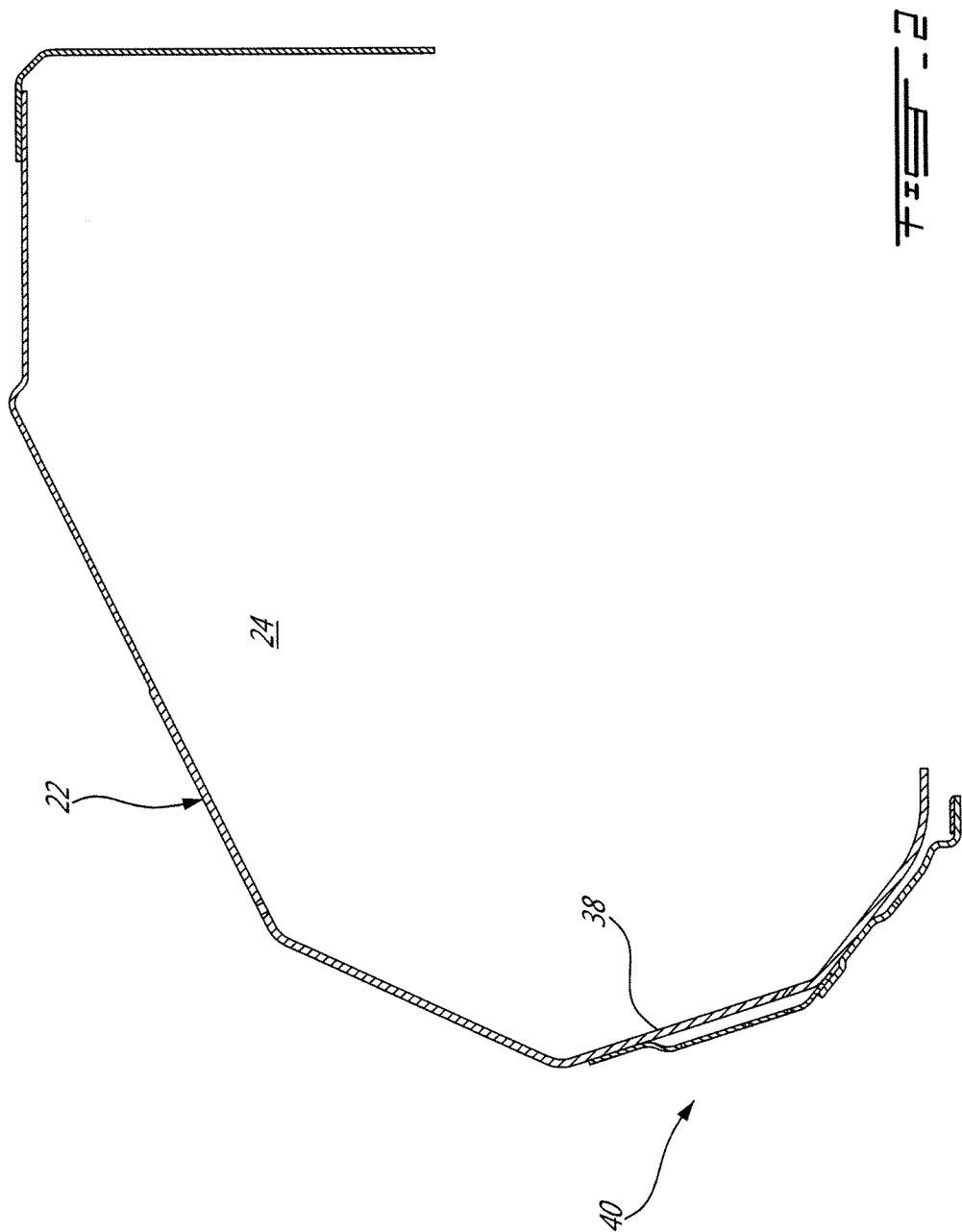

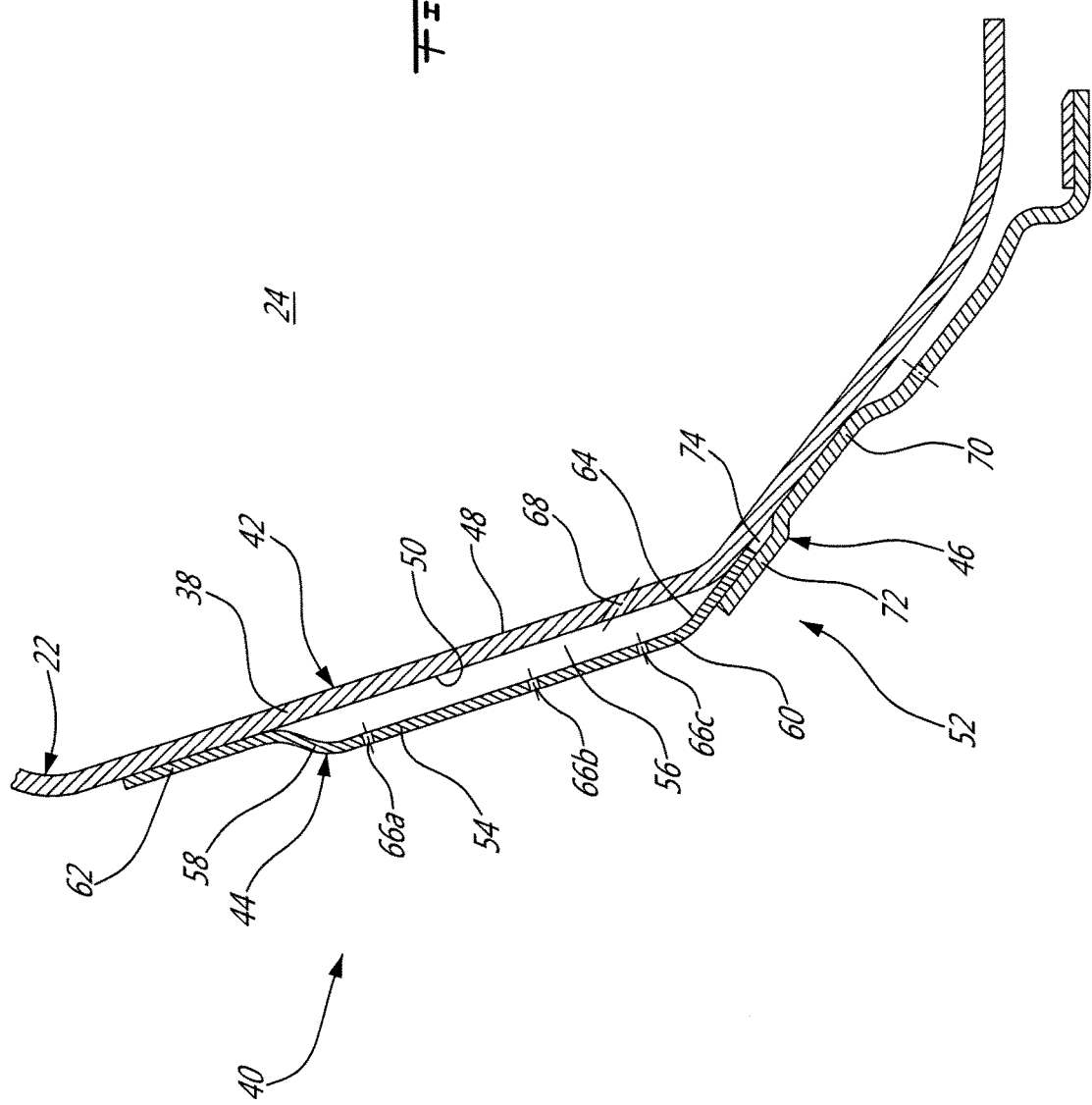

COMBUSTOR SKIN ASSEMBLY FOR GAS TURBINE ENGINE

TECHNICAL FIELD

The application relates generally to reverse flow combustors of gas turbine engines and their cooling of the large exit duct.

BACKGROUND OF THE ART

It was known in the art to manage heat-imparted wear to the large exit duct to prolong the lifespan using a cold skin assembled to the hot skin in a manner to form a cooling cavity therebetween which allowed to remove heat by two effects: first, the cold skin was provided with impingement holes through which cooling air passes to remove heat from the hot skin by convection; and second, the cooling air also passes through effusion holes in the hot skin, creating a protective air film on the hot surface. This effect combination was achieved using an air tight connection between the cold skin and the hot skin.

It was known to achieve the air tight connection using welding at both ends of the cold skin. However, the hot skin being exposed to higher temperature than the cold skin, its thermal growth was greater than that of the cold skin and the cold skin would be exposed to high stress which could lead to premature cracking at the weld joint. Hence the cold skin had to be relatively long so that internal stresses imparted therein by the thermal growth of the hot skin would not exceed established thresholds. This led to an extra amount of weight corresponding to the extra length, and extra weight is undesired in aircraft applications.

It was also known to achieve the connection using welding at one end, and a sliding forged ring assembly at the other end. However, this added significant costs in addition to weight.

Accordingly, there remains room for improvement in addressing the management of stress in the cold skin.

SUMMARY

In one aspect, there is provided a combustor skin assembly for a gas turbine engine, the assembly comprising: a hot skin forming at least a portion of a wall of a combustion chamber of the gas turbine engine, the hot skin having an inner face exposed to the combustion chamber, and an opposite outer face; a receiving skin formed of sheet metal and having a securing portion affixed to the hot skin outer face in an air-tight manner, and a receiving flange extending from the securing portion, the receiving flange being offset away from the hot skin outer face to form a female recess between the outer face of the hot skin and the receiving flange; and a cold skin formed of sheet metal and having a cold wall portion spaced from the hot skin and forming a cooling cavity therebetween, a securing portion extending from a first end of the cold wall portion and affixed to the hot skin outer face in an air-tight manner, and a male flange extending from a second end of the cold wall portion opposite the first end, the male flange being snugly received in the female recess and forming a sliding engagement between the male flange and the female recess.

In a second aspect, there is provided a gas turbine engine having a combustor skin assembly comprising: a hot skin forming at least a portion of a wall of a combustion chamber of the gas turbine engine, the hot skin having an inner face exposed to the combustion chamber, and an opposite outer face; a receiving skin formed of sheet metal and having a securing portion affixed to the hot skin outer face in an air-tight manner, and a receiving flange extending from the securing portion, the receiving flange being offset from the hot skin outer face and forming a female recess; and a cold skin formed of sheet metal and having a cold wall portion spaced from the hot skin and forming a cooling cavity therebetween, a securing portion extending from a first end of the cold wall portion, affixed to the hot skin outer face in an air-tight manner, and a male flange extending from a second end of the cold wall portion opposite the first end, snugly received in the female recess and forming a sliding engagement therewith.

In a third aspect, there is provided a method of sealing a sliding engagement formed between a male flange of a cold skin having a portion spaced from a hot skin of a gas turbine engine combustor and forming a cooling cavity therebetween, and a female recess formed between a receiving flange and the hot skin and in which the male flange is slidingly received, the method comprising: operating the gas turbine engine, thereby imparting a temperature gradient across the hot skin and the receiving flange causing thermal growth, upon which thermal growth the hot skin and the receiving flange positively squeeze the male flange therebetween.

In a fourth aspect, there is provided a method of assembling a combustor skin assembly comprising a hot skin forming at least a portion of a wall of a combustion chamber of the gas turbine engine, the hot skin having an inner face exposed to the combustion chamber, and an opposite outer face; a cold skin formed of sheet metal and having a securing portion extending from a first end of the cold wall portion, and a male flange extending from a second end of the cold wall portion opposite the first end, and a receiving skin formed of sheet metal and having a securing portion and a receiving flange extending from the securing portion, the method comprising: affixing the securing portion of the cold skin to the hot skin in an air-tight manner, with a cold wall portion of the cold skin being spaced from the hot skin; and positioning the receiving flange over the male flange, and affixing the securing portion of the receiving skin to the hot skin.

Further details of these and other aspects of the present invention will be apparent from the detailed description and figures included below.

DESCRIPTION OF THE DRAWINGS

Reference is now made to the accompanying figures, in which:

FIG. 2 is a cross-sectional view of a portion of the combustor of the gas turbine engine of FIG. 1;

FIG. 3 shows a portion of FIG. 2, enlarged to show detail.

DETAILED DESCRIPTION

Figure 1:
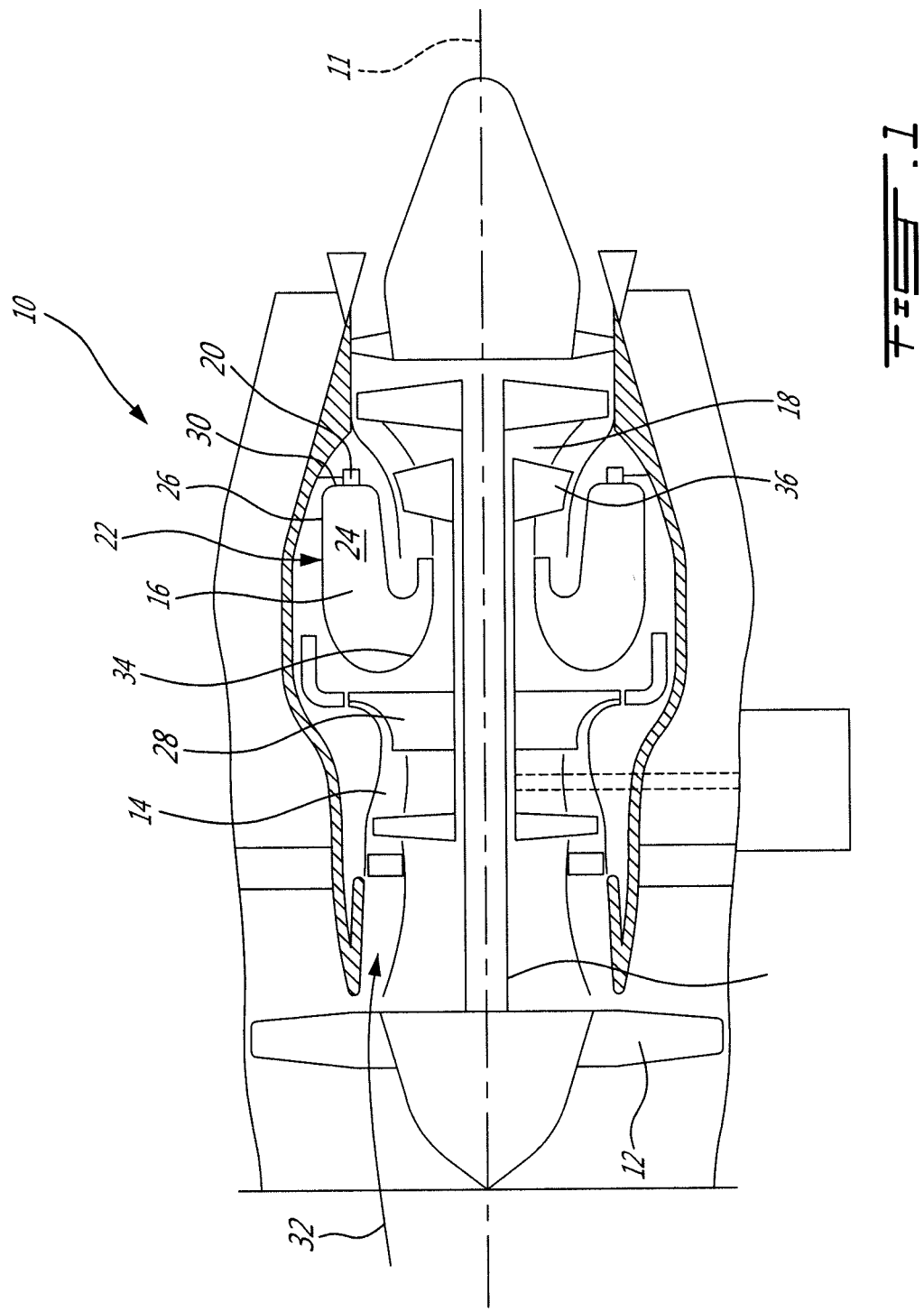
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 shown in FIG. 1 is of the reverse-flow type and is provided in the form of a ring extending circumferentially around the engine axis 11. The combustor 16 has a wall 22 delimiting a combustion chamber 24, and the wall 22 has a radially-outer portion 26. An annular stream of compressed air exits a centrifugal compressor stage 28 externally from the combustor 16 and envelops the radially-outer portion 26 of its wall 22. Air typically enters the combustion chamber 24 in a radially inward direction relative to the axis 11, across apertures (not shown) provided in the radially-outer portion 26 of the combustor wall 22. Fuel is typically provided from a plurality of circumferentially interspaced fuel nozzles 20 which spray fuel in an atomized state into the combustion chamber 24 across associated apertures typically provided in a rear wall portion 30 of the combustor 16. The combusting fuel and air mixture thus travels partially forward inside a portion of the combustion chamber 24, in a direction opposite the general gas path direction 32 across the gas turbine engine 10, prior to elbowing and exiting an exit duct portion 34 of the combustor 16 leading to the first turbine stage 36 in a direction corresponding to the general gas path direction 32 across the gas turbine engine 10.

Referring to FIG. 2, a portion 38 of the combustor wall 22 forming a portion of the elbow at a front end thereof is particularly subjected to impinging heat from the combusting fuel and air mixture. To manage this heat, and thereby favour a greater expected lifespan of the combustor wall 22, this portion 38 of the combustor wall is provided with a cooling system which includes a double skin assembly 40.

The skin assembly 40 is shown in greater detail in FIG. 3. A portion 38 of the combustor wall 22 forms a first one of these skins. Since this first skin has an inner face 48 directly exposed to the combustion gasses in the combustion chamber 24 during operation of the gas turbine engine 10, its temperature rises higher than the temperature of the second skin. Henceforth, the portion 38 of the combustor wall 22 is referred to as the hot skin 42 and the second skin is referred to as the cold skin 44. It will be understood that both skins 42, 44 are typically provided in the form of an annulus extending around the main axis 11 of the engine 10. Given this general annular shape or circumferential symmetry, the cross-section of a portion of the annulus shown in FIG. 3 can be understood to be generally representative of the shape of assembly 40.

In this embodiment, the skin assembly 40 generally includes three components: the hot skin 42, the cold skin 44, and a receiving skin 46. The cold skin 44 and the receiving skin 46 are both affixed to the outer face 50 of the hot skin 42 and form an airtight sliding engagement 52 with one another. In this embodiment, all three skins 42, 44, 46 of the assembly are formed of a sheet metal material known in the art as being resistant to the conditions of use in a combustor, such nickel-chromium, or cobalt based super alloys manufactured under the registered trademark INCONEL, or HAYNES, for instance.

The cold skin 44 is shaped with a portion which will be referred to herein as the cold wall portion 54, which is maintained spaced apart from the hot skin 42 to form a cooling cavity 56 therebetween. Referring to the section of the annular cold skin 44 shown in FIG. 3, the cold wall portion 54 can be said to have a length extending mostly radially and partly axially, with two opposite ends which can arbitrarily be referred to as the first end 58 and the second end 60. The cold skin 44 has a portion referred to as a securing portion 62 which extends from the first end 58 and which is affixed to the outer face 50 of the hot skin 42 in an air-tight manner. This can be achieved by welding the securing portion 62 to the hot skin 42, for instance. The cold skin 44 also has a male flange 64 which extends from the second end 60 of the cold wall portion 54. The thickness of the male flange 64 is determined from the thickness of the metal sheet from which the cold skin 44 is formed, which can be manufactured with a relatively high degree of precision in the order of a few thousands of an inch using known manufacturing processes. The cold wall portion 54 can have a plurality of impingement holes 66a, 66b, 66c which can be spaced both lengthwisely and circumferentially from one another to allow cooling air circulation therethrough, whereas the hot skin 42 can have effusion holes 68 therethrough.

The receiving skin 46 has a portion which will be referred to herein as the securing portion 70, by which it is affixed to the outer face 50 of the hot skin 42 in an air-tight manner. This can be achieved by welding the securing portion 70 to the hot skin 42, for instance. The receiving skin 46 also has a receiving flange 72 which extends from the securing portion 70 in an offset manner, thereby forming a female recess 74 between the receiving flange 72 and the hot skin 42. Given currently available sheet metal forming processes, the receiving skin 46 can be formed in a manner that the thickness of the female recess, or offset distance, can be repeatable in a highly precise manner, such as in the order of a few thousands of an inch, for instance, which allows to precisely adapt the thickness of the female recess 74 to the thickness of the male flange 64 of the cold skin 44, for the male flange 64 to be snugly received therein in a manner to form an air tight seal.

The female recess 74 can be formed of the same thickness than the male flange 64, or slightly smaller e.g. about 2 thousands of an inch smaller, and the components can be assembled as follows. First the cold skin 44 is welded to the hot skin 42. The cold skin 44 was formed such that after welding the male flange 64 just rests on the hot skin. Second, with the use of a locating fixture, the receiving skin 46 can be brought in its place. If the female gap 74 is smaller than the male flange 64, the securing portion 70 of the receiving skin 46 is not in contact with the hot skin 42. Then, under the pressure of seam welding wheels, the securing portion 70 of the receiving skin is forced into contact with the hot skin 42 and is welded in place. After welding and the resulting weld shrinkage, the male flange is tightly held, thus creating an air-tight seal.

If the female recess 74 can be made smaller than the thickness of the male flange 64 at ambient temperature to take into account the fact that during the operating condition, the female recess 74 can be subjected to growth given the thermal gradient between the cold side and the hot side. However, depending on the configuration and using as example the configuration illustrated in FIG. 3, the female recess 74 can also rotate slightly, due to the thermal gradient, and this rotation can also provide interfering seal with the male flange 64. Because the male flange 64 and female recess 74 are not welded together they are still able to slide with respect to each other, thus allowing an evacuation route to stress occurring upon the differential growth of the hot skin 42 and cold skin 44.

It will be noted that the receiving skin 46 can advantageously be provided in the form of a skin which is also used for another purpose. For instance, in the illustrated embodiment, the receiving skin 46 is provided in the form of a leg of the large exit duct having the receiving flange 72 provided as an extra portion thereof. In alternate embodiments, the receiving flange can be provided as a portion of an other component than a large exit duct leg.

The embodiment described above and illustrated can allow a sliding freedom of movement at one end of the cold skin 44 which can effectively reduce the amount of internal mechanical stress it can be subjected to by a relatively greater thermal growth occurring with the hot skin to which it is attacked, as compared to a cold skin having the same length and being welded to the hot skin at both ends. Moreover, the lower internal mechanical stress is achieved in this embodiment in a cost-effective, and relatively low weight manner.

The sliding skin assembly 52 can not only be manufactured as a component of new engines, it can be used on replacement combustor parts, or even potentially retro-fitted to existing engine designs.

The above description is meant to be exemplary only, and one skilled in the art will recognize that changes may be made to the embodiments described without departing from the scope of the invention disclosed. For example, the type of combustor to which the skin assembly is adapted to, the materials identified above, and the configuration, shape, and size of the skins can vary in alternate embodiments. Still other modifications which fall within the scope of the present invention will be apparent to those skilled in the art, in light of a review of this disclosure, and such modifications are intended to fall within the scope of the appended claims.

What is claimed is:

1. A combustor skin assembly for a gas turbine engine, the combustor skin assembly comprising:
   a hot skin forming at least a portion of a wall of a combustion chamber of the gas turbine engine, the hot skin having an inner face exposed to the combustion chamber, and an outer face opposite the inner face;
   a receiving skin formed of sheet metal separate from the hot skin and having a securing portion affixed to the outer face of the hot skin in an air-tight manner, and a receiving flange extending from the securing portion, the receiving flange being offset an offset distance away from the outer face of the hot skin to form a female recess between the outer face of the hot skin and the receiving flange; and
   a cold skin formed of sheet metal separate from both the hot skin and the receiving skin and having a cold wall portion spaced from the hot skin and forming a cooling cavity therebetween, a securing portion extending from a first end of the cold wall portion and affixed to the outer face of the hot skin in an air-tight manner, and a male flange extending from a second end of the cold wall portion opposite the first end, the male flange having a thickness being greater than the offset distance of the female recess to be snugly received in the female recess and form a sliding engagement between the male flange and the female recess, the receiving flange and the hot skin applying a compressive force to the male flange therebetween during operation of the gas turbine engine.

2. The combustor skin assembly of claim 1 wherein the male flange is interference fit with the female recess at ambient temperatures.

3. The combustor skin assembly of claim 1 wherein the cold skin has a plurality of interspaced impingement holes, the hot skin has a plurality of interspaced effusion holes, and both the cold skin, the hot skin, and the receiving skin are provided in the form of annular components.

4. The combustor skin assembly of claim 1 wherein the hot skin, the cold skin, and the receiving skin are each made of sheet metal of a nickel-chromium based super alloy.

5. The combustor skin assembly of claim 1 wherein the female recess is enclosed by the receiving flange, the hot skin, and the securing portion of the receiving skin.

6. The combustor skin assembly of claim 1 wherein the securing portion of the cold skin is affixed to the hot skin by one of welding and brazing, and the securing portion of the receiving skin is affixed to the hot skin by welding.

7. A gas turbine engine having a combustor skin assembly comprising:
   a hot skin forming at least a portion of a wall of a combustion chamber of the gas turbine engine, the hot skin having an inner face exposed to the combustion chamber, and an outer face opposite to the inner face;
   a receiving skin formed of sheet metal separate from the hot skin and having a securing portion affixed to the outer face of the hot skin in an air-tight manner, and a receiving flange extending from the securing portion, the receiving flange being offset an offset distance from the outer face of the hot skin and forming a female recess; and
   a cold skin formed of sheet metal separate from both the hot skin and the receiving skin and having a cold wall portion spaced from the hot skin and forming a cooling cavity therebetween, a securing portion extending from a first end of the cold wall portion, affixed to the outer face of the hot skin in an air-tight manner, and a male flange extending from a second end of the cold wall portion opposite the first end, the male flange having a thickness being greater than the offset distance of the female recess to be snugly received in the female recess and form a sliding engagement therewith, the receiving flange and the hot skin applying a compressive force to the male flange therebetween during operation of the gas turbine engine.

8. The gas turbine engine having the combustor skin assembly of claim 7 wherein the cold skin has a plurality of interspaced impingement holes, the hot skin has a plurality of interspaced effusion holes, and both the cold skin, the hot skin, and the receiving skin are provided in the form of annular components.

9. The gas turbine engine having the combustor skin assembly of claim 7 wherein the hot skin, the cold skin, and the receiving skin are each made of sheet metal of a nickel-chromium based super alloy.

10. The gas turbine engine having the combustor skin assembly of claim 7 wherein the female recess is enclosed by the receiving flange, the hot skin, and the securing portion of the receiving skin.

11. The gas turbine engine having the combustor skin assembly of claim 7 wherein the corresponding securing portions of both the receiving skin and the cold skin are affixed to the hot skin by welding.

12. A method of assembling a combustor skin assembly comprising a hot skin forming at least a portion of a wall of a combustion chamber of a gas turbine engine, the hot skin having an inner face exposed to the combustion chamber, and an opposite outer face; a cold skin formed of sheet metal and having a securing portion extending from a first end, and a male flange extending from a second end opposite the first end, and a receiving skin separate from the hot skin and the cold skin formed of sheet metal and having a securing portion and a receiving flange extending from the securing portion, the method comprising affixing the securing portion of the cold skin to the hot skin in an air-tight manner, with a cold wall portion of the cold skin being spaced from the hot skin;

positioning the receiving flange over the male flange, the male flange having a thickness being greater than a distance between the receiving flange and the outer surface of the hot skin; and affixing the securing portion of the receiving skin to the hot skin, the male flange thereafter remaining compressively squeezed between the receiving flange and the hot skin.

\* \* \* \* \*